United States Patent
Takahashi et al.

(10) Patent No.: US 8,421,386 B2
(45) Date of Patent: Apr. 16, 2013

(54) CONTROL APPARATUS FOR MULTI-PHASE ROTARY MACHINE

(75) Inventors: Tomoya Takahashi, Anjo (JP); Akihiro Imura, Aichi-ken (JP)

(73) Assignee: Denso Corporation, Kariya (JP)

( * ) Notice: Subject to any disclaimer, the term of this patent is extended or adjusted under 35 U.S.C. 154(b) by 332 days.

(21) Appl. No.: 13/004,289

(22) Filed: Jan. 11, 2011

(65) Prior Publication Data

US 2011/0169436 A1  Jul. 14, 2011

(30) Foreign Application Priority Data

Jan. 11, 2010  (JP) ................................ 2010-003490

(51) Int. Cl.
*H02P 21/00* (2006.01)
(52) U.S. Cl.
USPC ............. 318/400.02; 318/400.03; 318/400.07
(58) Field of Classification Search ............. 318/400.02, 318/400.03, 400.07, 148, 801, 811, 139; 307/9.1

See application file for complete search history.

(56) References Cited

U.S. PATENT DOCUMENTS

| | | | |
|---|---|---|---|
| 2006/0125435 A1 | 6/2006 | Geyer et al. | |
| 2010/0308649 A1* | 12/2010 | Kono et al. | 307/9.1 |

FOREIGN PATENT DOCUMENTS

| | | |
|---|---|---|
| JP | H07-213071 | 8/1995 |
| JP | 3494928 | 11/2003 |
| JP | 2006-174697 | 6/2006 |
| JP | P2008-228419 A | 9/2008 |

OTHER PUBLICATIONS

Japanese Office Action dated Jan. 24, 2012, issued in corresponding Japanese Application No. 2010-003490, with English translation.
Kadota, M. et al., "A Study on Current Control System of PMSM Operating of High Speed Based on Model Predictive Control", The Institute of Electrical Engineers of Japan, (2006), pp. 175-176.
U.S. Appl. No. 12/861,436, filed Aug. 23, 2010.

* cited by examiner

*Primary Examiner* — Karen Masih
(74) *Attorney, Agent, or Firm* — Nixon & Vanderhye P.C.

(57) ABSTRACT

A control apparatus controls an inverter (electric power converter circuit) which is connected for selectively applying a plurality of voltage levels to each phase of a polyphase rotary machine. In each of successive control periods, the apparatus determines the inverter operation state (combination of respective voltage levels applied to the phases) to be set for the succeeding control period, by performing prediction calculations based on a model of the rotary machine, for each of a plurality of candidates for the next operation state, to select an optimum candidate. The candidates are restricted to those operation states whereby the voltage level of no more than one of the phases will be changed, at changeover to the operation state of the next control period.

8 Claims, 13 Drawing Sheets

FIG. 2A

| VOLTAGE VECTOR | SWITCHING ELEMENTS WHICH ARE IN THE "ON" STATE | | |
|---|---|---|---|
| | U-PHASE | V-PHASE | W-PHASE |
| V0 | LOWER ELEMENT | LOWER ELEMENT | LOWER ELEMENT |
| V1 | UPPER ELEMENT | LOWER ELEMENT | LOWER ELEMENT |
| V2 | UPPER ELEMENT | UPPER ELEMENT | LOWER ELEMENT |
| V3 | LOWER ELEMENT | UPPER ELEMENT | LOWER ELEMENT |
| V4 | LOWER ELEMENT | UPPER ELEMENT | UPPER ELEMENT |
| V5 | LOWER ELEMENT | LOWER ELEMENT | UPPER ELEMENT |
| V6 | UPPER ELEMENT | LOWER ELEMENT | UPPER ELEMENT |
| V7 | UPPER ELEMENT | UPPER ELEMENT | UPPER ELEMENT |

FIG. 2B

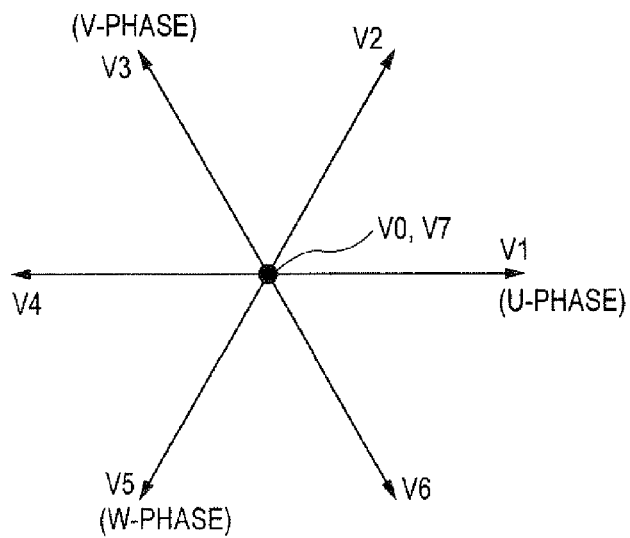

FIG. 2C

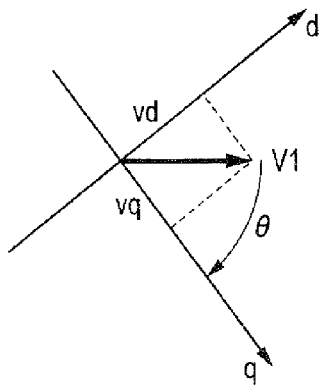

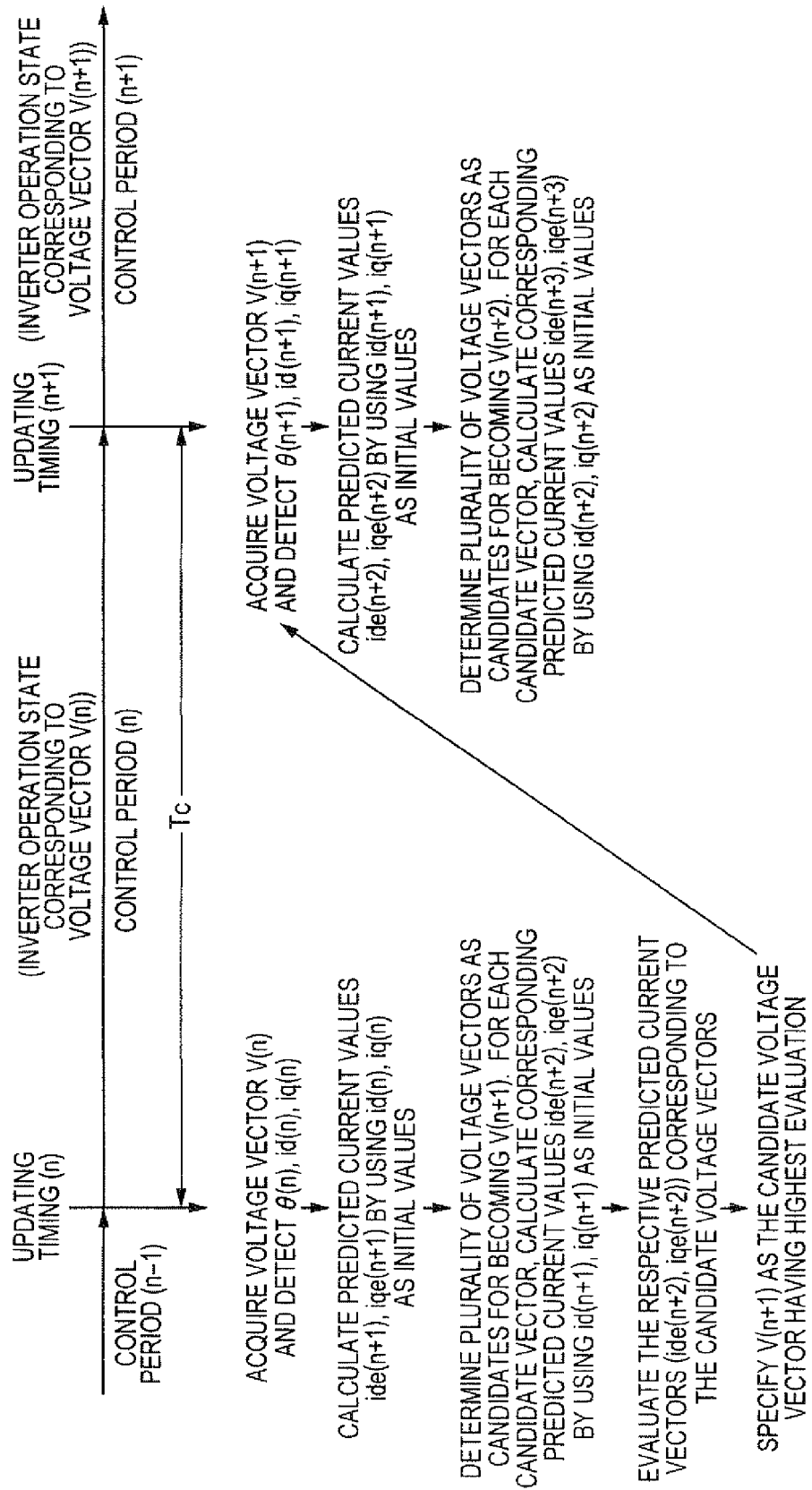

CONTROL APPARATUS FOR MULTI-PHASE ROTARY MACHINE

CROSS-REFERENCE TO RELATED APPLICATIONS

This application is based on and incorporates herein by reference Japanese Patent Application No. 2010-3490 filed on Jan. 11, 2010.

BACKGROUND OF THE INVENTION

1. Field of Application

The present invention relates to a control apparatus for controlling a control quantity of a polyphase rotary machine, by controlling an inverter (electric power converter circuit) having switching elements connected to the phases of the rotary machine, the switching elements being operated to selectively connect each of the phases to at least two different DC voltage levels.

2. Description of Related Art

It is known, for example as described in Japanese patent application publication No. 2006-174697 (designated in the following as reference 1), that such a type of control apparatus can utilize predictive control by applying a mathematical model, for maintaining the torque or stator magnet flux values of a rotary machine within a predetermined range while restricting the switching frequency of the switching elements. With the control method of reference 1, at each of successive periodic timings (k−1), k, (k+1), ..., an appropriate operation state of the inverter (combination of on/off condition of the switching elements) is determined, to be established at the next timing. With the described embodiment, the inverter can apply three different voltage levels (+v, 0, −v) to each of the 3 phases of the rotary machine, i.e., there is a total of 27 ($3^3$) operation states of the inverter. As illustrated in the state diagram of FIG. 3 of reference 1, a plurality of sequences of operation states can extend from each operation state, by respective paths. With a specific operation state having been precedingly established for the current timing (k), all of the possible operation state sequences that extend from that timing (k) are first determined, up to a predetermined number N of future timings, i.e., over a time range k, (k+1), ... (k+N−1) (where N≧1). Considering only control of torque, for each of the future operation states corresponding to these future updating timings, a mathematical model of the rotary machine is applied to calculate corresponding predicted values of torque developed by the rotary machine. Each locus of such predicted values is referred to as a trajectory, i.e., a corresponding trajectory of predicted torque values is obtained for each of the possible operation state sequences that extend from the present timing.

FIG. 13 of the drawings of the present application illustrate this, for the case of two possible torque trajectories T1 and T2 extending from the timing k, with a trajectory T3 branching from the trajectory T1 at the timing (k+1). Prior to the timing (k+1), the operation state to be established at that timing (k+1) is determined as follows. The time range of the prediction calculations extends to the timing (k+2) in this example. As shown, the trajectory T3 is predicted to depart from a predetermined range of torque values before the timing (k+2) is reached. When the trajectory T2 is extrapolated, it is predicted to depart from the predetermined torque range at approximately the timing (k+3), while the T1 (extrapolated) is predicted to remain within the predetermined torque range for a longer time.

Each of these trajectories is then examined to find the total number of successive operation state transitions until the trajectory is predicted to depart from the predetermined torque range (for example, one transition in the case of the trajectory T3, two transitions for trajectory T2). The total number of switching element (on or off) operations required to effect these transitions is then calculated, for each of the trajectories.

An evaluation coefficient is then calculated, for each trajectory, by dividing the corresponding total number of switching element operations by the corresponding total number of operation state transitions. The trajectory having the smallest value of evaluation coefficient (i.e., the lowest frequency of switching element changeovers) is then selected as optimum. Hence, the operation state which is next in the operation state sequence of that optimum trajectory is selected, to be set as the next operation state. For example if the trajectory T2 in the above example were judged (at timing k) to be optimum, then the operation state indicated as OS1 would be set as the actual operation state of the inverter at timing (k+1).

The above processing is repeated at each of successive time steps. The switching frequency of the inverter can thereby be limited.

Another example of a related prior art control method, having similar objectives, is described in "A Study on Current Control System of PMSM Operating at High Speed Based on Model Predictive Control" by Kadota et al, IEE All-Japan Conference 2006, volume 4, pp. 175-176. The method is described for application to a PMSM (permanent magnet synchronous motor) driven by an inverter. For each of successive intervals referred to as slots, model prediction is applied to the operating parameters of the PMSM for determining a pattern (sequence of switching modes of the inverter) which will result in a minimum number of changeovers of the switching elements during that slot, while ensuring that the drive current of the motor will be in accordance with a command value.

However with such prior art methods, although the switching frequency of the inverter can be limited, it is not possible to avoid a condition whereby the voltage levels applied to a plurality of the phases of the rotary machine are switched concurrently. When such a condition occurs, voltage surges appear across the input/output terminals of the switching elements and across a smoothing capacitor connected between the input terminals of the inverter. As a result, the withstanding voltage requirements for the switching elements and the smoothing capacitor are increased accordingly. This results in increased cost and increased size of the hardware of the inverter.

SUMMARY OF THE INVENTION

It is an objective of the present invention to overcome the above problem by providing a control apparatus for an electric power converter circuit, the electric power converter circuit being connected to respective phases of a polyphase rotary machine and comprising a plurality of switching elements controlled to selectively connect each of the phases to a plurality of DC voltages, and with a control quantity of the rotary machine being controlled based on calculated predicted values of the control quantity, with the calculations based on a mathematical model of the operation of the polyphase rotary machine, whereby the frequency of switching element operations (frequency of on/off changeovers) can be restricted while at the same time restricting the amplitudes of voltage surges that are produced by the inverter as a result of the switching element operations.

To achieve the above objective, a control apparatus according to the present invention includes prediction circuitry, configured for predicting future values of a control quantity of the polyphase rotary machine based on respective assumed operation states of the electric power converter circuit, where the operation states correspond to respective combinations of switched statuses (i.e., combinations of connections to respective voltage levels, with the combinations corresponding to respective voltage vectors applied to the rotary machine). The control apparatus also includes operation control circuitry, configured for determining a future operation state that is to be established for the electric power converter circuit, with the determination based upon predicted values of the control quantity.

The control apparatus is characterized in that the operation control circuitry is configured to determine the future operation state such that a specific changeover requirement is satisfied. This is a requirement that no more than one of the phases of the rotary machine will undergoes a change in connection condition (that is, will become connected to a changed voltage level) when a changeover occurs from the present operation state of the power converter circuit to the future operation state.

The basic features of such a control apparatus can be summarized as follows. An updated operating state of the inverter is determined for each of successive intervals referred to as control periods. Prior to changeover to a future operating state (to be set during a future control period) the value of a control quantity that will be attained by the end of that future control period is predicted, for each of a plurality of candidate operating states (i.e., candidate voltage vectors). Each of the candidates must satisfy the above-defined specific changeover requirement. The control quantity may for example be a current vector, magnetic flux vector, or torque value of the rotary machine, or a combination of such quantities. The prediction is performed by iteratively applying discrete-time difference equations for a prediction interval whose duration is equal to the control period duration, based on a mathematical model of the rotary machine, utilizing detected values of the control quantity and of operating parameters (including the electrical angular velocity) of the rotary machine in the calculations. The candidate for which the corresponding predicted control quantity value is evaluated to be closest to a required value of the control quantity (as judged based on absolute values of parameters) is then selected. The selected candidate is thereafter set as the operation state of the power converter circuit during the specified future control period, i.e., is set as the voltage vector that is applied to the phase windings of the rotary machine by the power converter circuit during that period.

If a plurality of the candidates receive equally high evaluations, then the one of these which is next in a forward sequence of the operating states (i.e., forward sequence of the voltage vectors applied by the power converter circuit) is selected. Here "forward sequence" signifies a sequence of operation states which corresponds to the direction in which the rotor of the polyphase rotary machine is rotating.

It has been found that such a form of control enables the frequency of switching operations (frequency of changes in switched status of the switching elements) to be restricted, while also restricting the amplitudes of voltage surges which can arise in the power converter circuit at an instant of changeover of the operation state.

BRIEF DESCRIPTION OF THE DRAWINGS

FIGS. 2A, 2B and 2C are diagrams for describing operation states of an inverter of the first embodiment;

FIG. 9 is a conceptual diagram for illustrating timing relationships of processing operations executed by the first embodiment;

DESCRIPTION OF PREFERRED EMBODIMENTS

Figure 1:
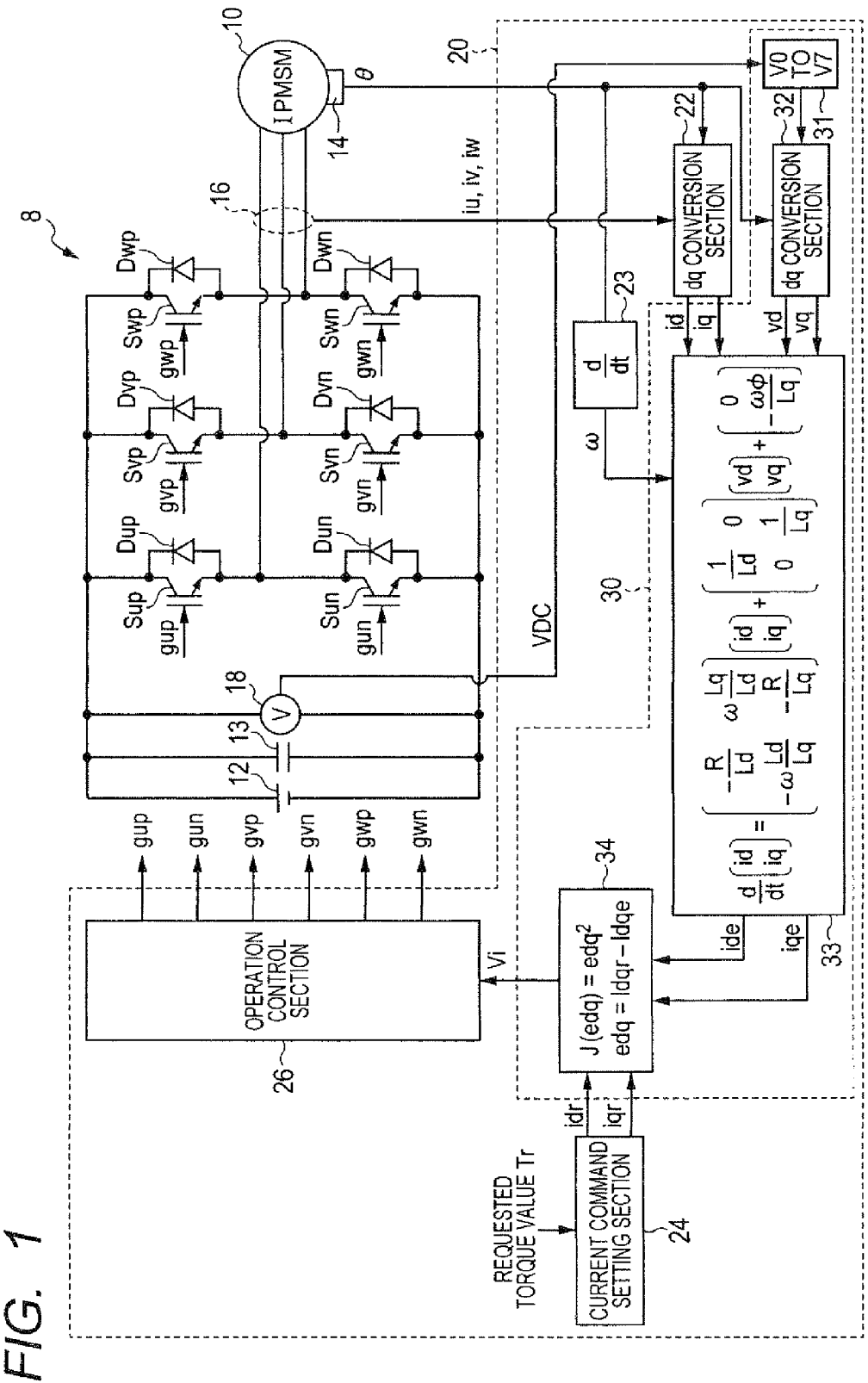
FIG. 1 shows a system diagram of a first embodiment of a control apparatus, for controlling the value of torque produced by an IPMSM.

A first embodiment, described in the following, is a control apparatus for an inverter (electrical power converter apparatus) which drives an IPMSM (Interior Permanent Magnet Synchronous Motor), intended for installation in a hybrid motor vehicle. FIG. 1 shows the overall configuration of the embodiment, connected to a motor-generator 10 and to an inverter 8 which drives the motor-generator 10 and is controlled by a control apparatus 20. The motor-generator 10 is a 3-phase IPMSM, with the operation as a synchronous induction motor being described in the following.

For ease of understanding, the control apparatus 20 is described as a set of interconnected system sections in the following, however it will be understood that in practice the described functions of these sections are performed by circuitry based on a usual type of microcomputer having a CPU, ROM, RAM, etc., which executes a stored program.

A high-voltage battery 12 is connected to supply a DC operating voltage to the inverter 8, with a smoothing capacitor 13 being connected between the output terminals of the high-voltage battery 12. The inverter 8 is formed of three series-connected pairs of switching elements as shown, i.e., the pair Sup, Sun, the pair Svp, Svn, and the pair Swp, Swn. The junction points of the pair Sup, Sun, the pair Svp, Svn, and the pair Swp, Swn are respectively connected to the U, V and W phase terminals of the motor-generator 10.

With this embodiment, each of the switching elements Sup, Sun, Svp, Svn, Swp and Swn is an IGBT (Insulated Gate Bipolar Transistor). Diodes Dup, Dun, Dvp, Dvn, Dwp, Dwn are respectively connected in parallel with the switching elements Sup, Sun, Svp, Svn, Swp and Swn, in reverse direction to the direction of forward current flow through the switching elements.

The angular position of the rotor of the motor-generator 10 is detected by a rotation angle sensor 14, to obtain the rotor electrical angle (referred to in the following simply as the electrical angle) θ. A current sensor 16 detects the respective values of current iu, iv, iw of the phases U, V, W of the motor-generator 10. A voltage sensor 18 detects the input voltage (power source voltage) VDC of the inverter 8.

The detection values obtained by these sensors are acquired via an interface ((not shown in the drawings) by the control apparatus 20, which operates as a low-voltage system. Based on the detection values from the sensors, the control apparatus 20 generates operation signals for determining the operation state of the inverter 8, i.e., operation signals gup, gun, gyp, gvn, gwp, gwn, respectively applied to the control electrodes of the switching elements Sup, Sun, Svp, Svn, Swp and Swn.

The control apparatus 20 controls the inverter 8 to maintain the level of torque generated by the motor-generator 10 close to a request torque value Tr. To achieve this, the inverter 8 is controlled to supply respective values of current to the phases of the motor-generator 10 in accordance with a command current vector (idr, iqr), calculated in accordance with the request value of torque Tr. Thus with this embodiment, although the amount of torque generated by the motor-generator 10 is the final control quantity, the current vector supplied to the motor-generator 10 is the directly controlled quantity. In particular with this embodiment, to control the currents flowing in the motor-generator 10 in accordance with the command current vector, the values of current which will flow in the motor-generator 10 for respectively different ones of a plurality of operating conditions of the inverter 8 are predicted by utilizing model predictive control. Essentially, the next operation state of the inverter 8 is selected as the operation state that is predicted to result in an actual current vector which is close to the command current vector, as evaluated based on an evaluation coefficient as described hereinafter, while also ensuring that each time the operation state of the inverter is updated, no more than one of the phases of the motor-generator 10 will become connected to a changed voltage level.

Based on the electrical angle θ which is detected by the rotation angle sensor 14, the dq converter 22 converts the phase current values iu, iv, iw detected by the current sensor 16 to a vector (id, iq) of a d, q 2-axis coordinate system which rotates with the rotor of the motor-generator 10. Basically, the detected set of iu, iv, iw current values are first converted to a vector expressed in a stationary 2-axis coordinate system, which is then rotated through an angle equal to the detected electrical angle θ, and the components (id, iq) of the vector (actual current vector) are obtained with respect to the rotated coordinates. Since the calculations for performing these operations are well documented, description is omitted.

Periodically detected values of the electrical angle θ are also inputted to the speed calculation section 23, which thereby calculates the electrical angular velocity ω. The aforementioned command current vector (idr, iqr), the actual current vector (id, iq), and electrical angular velocity ω are each inputted to a model predictive control section 30 of the control apparatus 20, together with a voltage vector (vd, vq) described hereinafter. Based on these input parameters, at each of periodic updating timings, the model predictive control section 30 determines a voltage vector Vi expressing the operation state of the inverter 8 (i.e., specific combination of states of the switching elements) which is to be established at the next updating timing, and inputs information expressing the voltage vector Vi to the operation control section 26. At the next updating timing, the operation control section 26 generates operation signals for controlling the switching elements of the inverter 8 to set the operation state that corresponds to the voltage vector Vi (i.e., so that the combination of voltage levels expressed by the voltage vector Vi becomes applied to the phase windings of the rotary machine 10) and supplies these operation signals to the inverter 8.

The inverter 8 has eight possible operation states (8 possible combinations of connection states of the phases of the motor-generator 10) as shown by the table of FIG. 2A. As can be understood from FIG. 2A, each of the operation states can be expressed as a combination of three (u, v, w) values, each of which is either VDC/2 (corresponding to a high-voltage side switching element being set ON) or −VDC/2 (corresponding to a low-voltage side switching element being set ON). The eight operation states thus correspond to respective vectors V0 to V7, as indicated in FIG. 2A. For example, the voltage vector V0 is expressed as (−VDC/2, −VDC/2, −VDC/2), and similarly, the voltage vector V1 is expressed as (VDC/2, −VDC/2, −VDC/2). The voltage vector V0 corresponds to the operation state in which each of the low-voltage side switching elements Sun, Svn, Swn is ON, while the voltage vector V7 corresponds to the operation state in which each of the high-voltage side switching elements Sup, Svp, Swp is ON. Hence each of the vectors V0 and is V7 (referred to as the zero vectors) corresponds to an operation state in which there is zero voltage between each of the pairs of phases of the motor-generator 10. The remaining six voltage vectors V1 to V6 (the non-zero vectors) each correspond to a switching mode in which at least one high-voltage side switching element and at least one low-voltage side switching element is in the ON state, The voltage vectors V1, V3 and V5 correspond to operation states in which only the U, V and W phases respectively are connected to the positive side of the supply voltage VDC.

Each of the voltage vectors V0 to V7 can be expressed as a vector in a stationary 2-axis coordinate system, as shown in FIG. 2B.

The prediction processing executed by the model predictive control section 30 will be described in the following. When prediction processing is to be executed using a specified one of the voltage vectors V0 to V7, the specified vector (expressed in a stationary 2-axis coordinate system as illustrated in FIG. 2B) is supplied by the operation state setting section 31 to the dq conversion section 32. The coordinate system is then rotated by an amount equal to the detected electrical angle, and the components vd, vq of the voltage vector are then obtained with respect to the rotated dq coordinate system, and inputted to the prediction section 33. This is illustrated by FIG. 2C, for the case of the voltage vector V1. In this example, it is assumed that if the operation state corresponding to the voltage vector V1 is established at a time point when the electrical angle θ has become as indicated, the vector V1 components (vd, vq) with respect to the rotated d, q axes become as shown.

Based on the voltage vector (vd, vq), the values (id, iq) of the actual (detected) current vector, and the electrical angular velocity ω, the model predictive control section 30 calculates a predicted current vector for a prediction interval (i.e., a current vector which is predicted to be attained by the end of that interval). Specifically, the prediction interval is treated as a succession of discrete time-steps. The component values of the actual current vector (id, iq) are used as initial values (i.e., for calculating the predicted current vector that which will be reached by the end of the first time-step).

The prediction calculations are based on equations (c3), (c4) below, for obtaining the predicted rate of change of current in each of successive time-steps, and thereby calculate the predicted value of current attained at the end of a prediction interval (succession of time-steps) by iterative calculations applying discrete-time difference equations over the prediction interval. The equations (c3), (c4) are obtained by differentiating the current terms in the voltage equations (c1), (c2) below, which are derived based on a model of the motor-generator 10, and express relationships between the voltage vector components vd and vq applied to the motor-generator 10 and the d-axis and q-axis inductance values Ld, Lq of the stator windings, the stator winding equivalent resistance R, the rate of change ω of the electrical angle θ (i.e., rotational angular velocity), and the magnetic flux linkage constant φ of the rotor, with p denoting the differential operator (derivative with respect to time).

$$vd = (R+pLd) \cdot id - \omega Lq \cdot iq \qquad (c1)$$

$$vq = \omega \cdot Ld \cdot id \cdot (R+pLq)iq + \omega \cdot \phi \qquad (c2)$$

$$pid = -(R/Ld) \cdot id + \omega \cdot (Lq/Ld) \cdot iq + vd/Ld \qquad (c3)$$

$$piq = -\omega \cdot (Ld/Lq) \cdot id - (Rd/Lq) \cdot iq + vq/Lq - \omega \cdot \phi/Lq \qquad (c4)$$

The prediction calculations are performed for each of a plurality of operation states of the inverter 8, expressed by corresponding ones of a sub-group of the voltage vectors V1~V0, i.e., voltage vectors which have been selected as candidates to be applied in a succeeding control period, as described hereinafter.

Designating a predicted current vector obtained by the prediction section 33 as (ide, iqe), corresponding to one of the candidate voltage vectors, the current vector (ide, iqe) is inputted to the operation state determining section 34 together with the command current vector (idr, iqr). Each of the predicted current vectors (ide, iqe) is evaluated with respect to the command current vector (idr, iqr), to derive an evaluation coefficient J, which is assigned to the corresponding candidate voltage vector. The voltage vector having the lowest value of J is then selected, to be applied in the next control period.

Specifically, the evaluation coefficient J is calculated as the square of the modulus of the difference vector between the command current vector (idr, iqr) and the predicted current vector (ide, iqe), so that the evaluation coefficient is obtained as a scalar absolute value.

Each of the vector components idr, iqr, ide, iqe may take a positive or negative value. With this method of evaluation, since the evaluation is performed based on absolute values of parameters, it is ensured that the smaller the differences between respective components of a predicted current vector (ide, iqe) and the command current vector (idr, iqr), the smaller will become the evaluation coefficient J, irrespective of positive or negative signs of the vector components.

Figure 3:
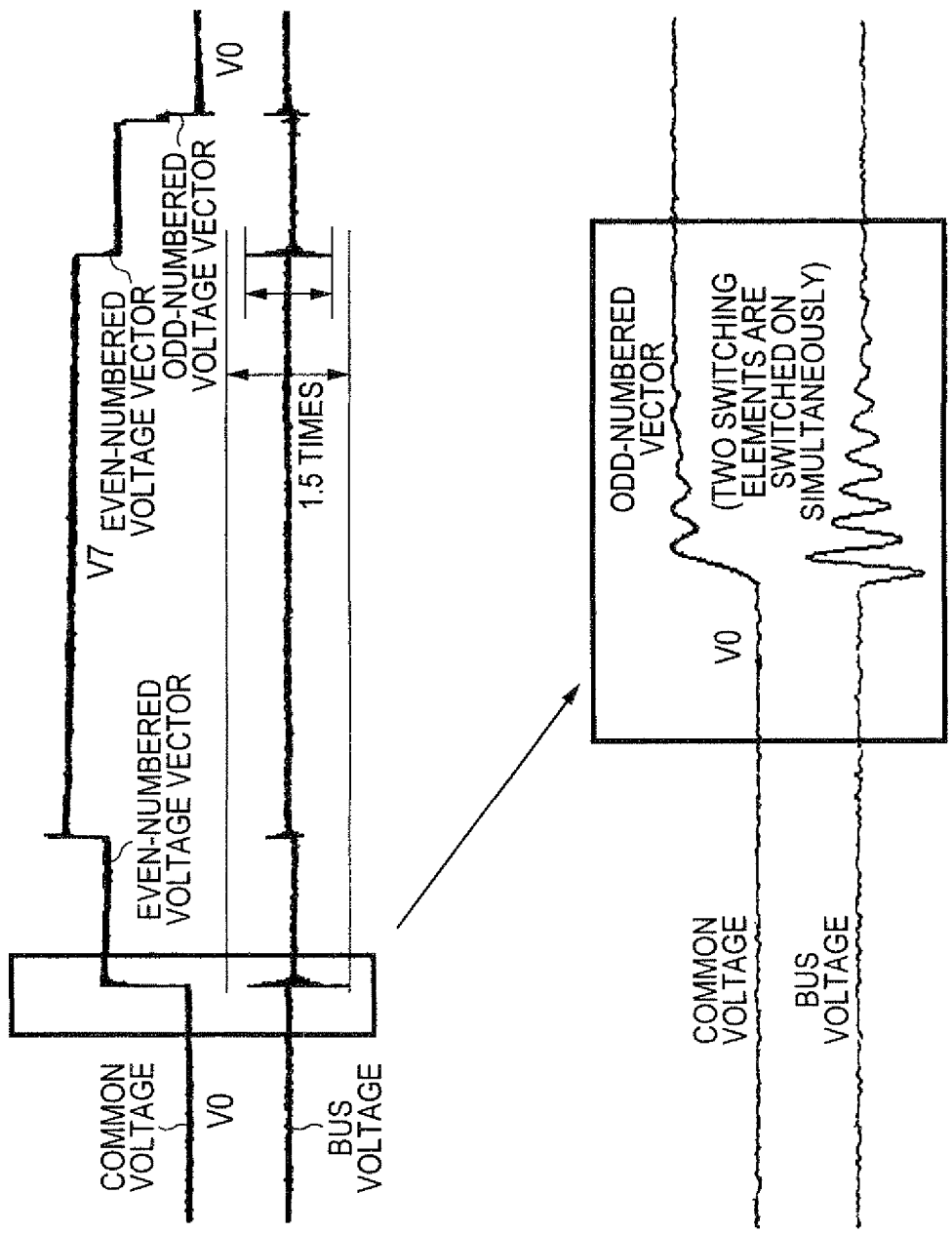
FIG. 3 is a timing diagram showing an example of relationships between forms of changeover of operation state of the inverter and resultant voltage surge amplitudes.

Each time the operation state of the inverter 8 is changed, a voltage surge is produced, which is superimposed on the bus voltage (voltage between the terminals of the smoothing capacitor 13) and on the common voltage of the U, V, W phases. The greater the number of switching elements whose states are simultaneously changed over by such a change in operation state, the greater becomes the amplitude of these voltage surges. For example as can be understood from the table of FIG. 2A, when a mode changeover is performed from the voltage vector V0 to any one of the even-numbered voltage vectors 2, 4 or 6, the states of two switching elements become changed simultaneously. FIG. 3 illustrates the magnitudes of these voltage surges when such a changeover from the zero vector V0 to an even-numbered voltage vector occurs. As the number of phases whose switch condition is changed simultaneously is increased, the surge voltage amplitude increases accordingly.

When these surge voltages are high in amplitude, it becomes necessary to ensure increased values of withstanding voltage for the switching elements of the inverter 8 and for the smoothing capacitor 13. However with this embodiment as described in the following, processing is executed such as to minimize these voltage surges.

Figure 4:
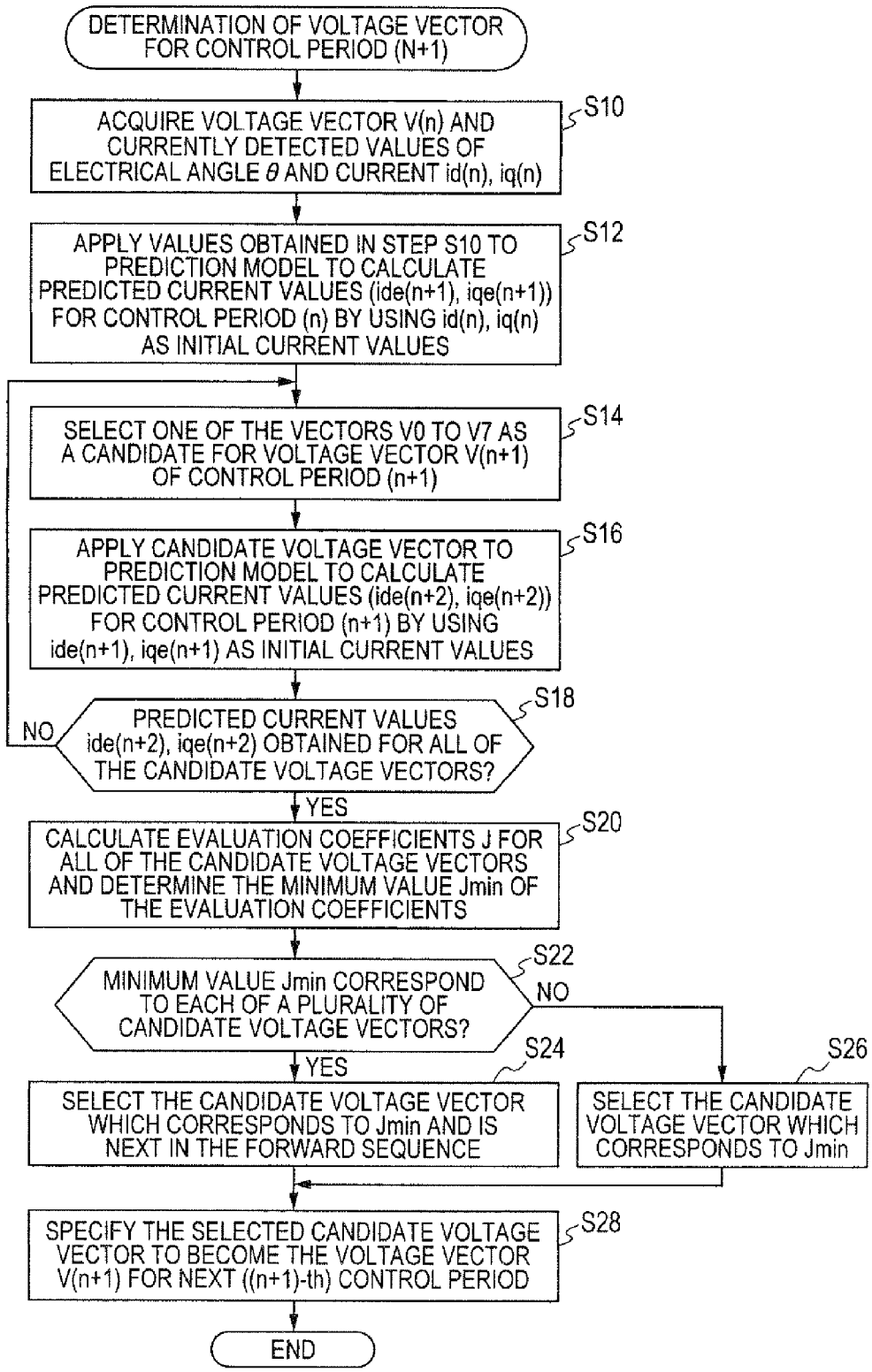
FIG. 4 is a flow diagram of a processing sequence performed during a control period by employing model predictive calculations, for selecting an updated operation state of the inverter, to be applied for the succeeding control period.

To achieve this, the processing routine shown in FIG. 4 is executed by the embodiment at each of successive updating timings, to implement the functions described above referring to FIG. 1, in particular the functions described for the model predictive control section 30. Each interval between successive updating timings is referred to as a control period, of duration Tc. As illustrated in FIG. 9, an updating timing (n) is followed by a control period (n), in which the operation state of the inverter 8 is held in accordance with a previously determined one of the voltage vectors V0 to V7. The voltage vector V(n+1) that is to be set for the succeeding control period (n+1) is determined at the updating timing (n).

The processing of FIG. 4, executed at an updating timing (n), is as follows. Firstly (step S10), the electrical angle θ(n) and the actual current vector (id(n), iq(n)) of the motor-generator 10 at that point in time are each detected, and information specifying the voltage vector V(n) (one of the voltage vectors V0~V7, which was determined in the preceding execution of this processing routine) is acquired. The inverter 8 is then set in the operation state corresponding to that voltage vector, by operation signals applied to the switching elements of the inverter 8. The currently derived electrical angular velocity ω is also acquired.

In addition, the d,q components vd(n), vq(n) of the voltage vector V(n) are also derived, based on the detected electrical angle θ as described above.

Figure 10A:
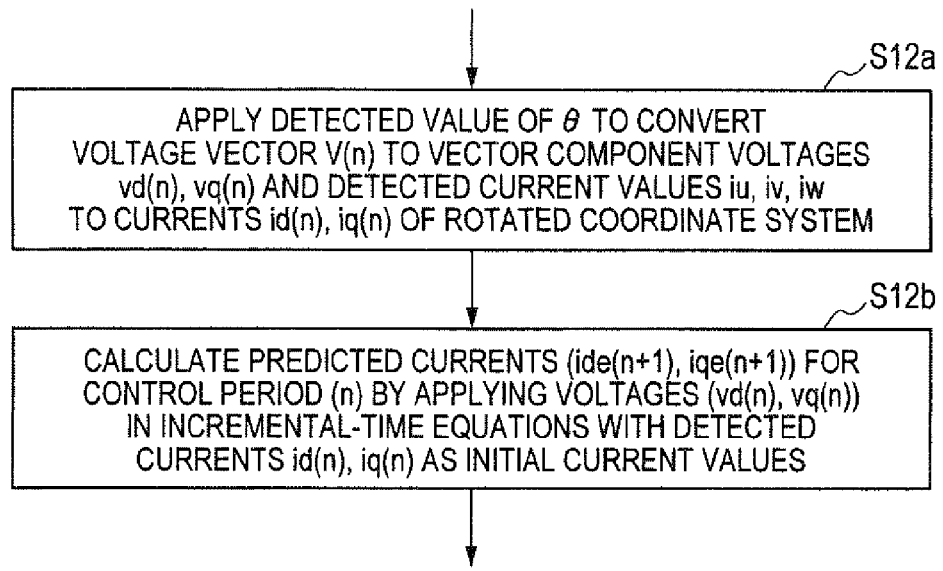
FIGS. 10A, 10B, 11 and 12 are flow diagrams for illustrating processing contents of steps of the flow diagram of FIG. 4.

Next in step S12, the components ide(n+1), iqe(n+1) of a predicted current vector are calculated, i.e., the current vector which is predicted to be attained by the end of the control period (n). This is performed using discrete-time difference equations in conjunction with equations (c3), (c4) as described above, with the prediction interval being the duration of a control period, and with the actual (detected) current values id(n), iq(n) from step S10 being respective initial values of current for the difference equation calculations. These processing contents of step S12 are illustrated in FIG. 10A.

Next, a plurality of repetitions of a sequence of steps S14 to S18 is performed. In each execution of step S14, one of a plurality of candidate voltage vectors (one of V0~V7) is selected. Each of these is a candidate for the voltage vector V(n+1), to be applied in the succeeding control period (n+1). Each candidate voltage vector must satisfy the above-described condition that the transition from the voltage vector V(n) of the control period (n) to the voltage vector V(n+1) at the start of the next control period does not result in more than one of the phases of the motor-generator 10 being switched to a different voltage level.

Specifically, if the voltage vector V(n) is a non-zero vector Vi (i=1~6), the voltage vector V(n+1) is set as Vi−1, Vi, or Vi+1 (mod 6), or as a zero vector (depending upon evaluation results as described hereinafter). If V(n+1) is to be set as a zero vector, then if V(n)=V2k (k=1~3), the zero vector V7 is selected, whereas if V(n)=V2k−1, the zero vector V0 is selected.

Figure 5A:
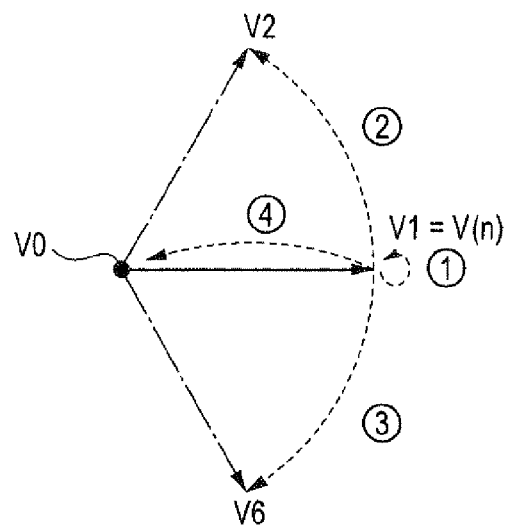
FIGS. 5A, 5B, 5C are diagrams illustrating a method of voltage vector selection, used with the first embodiment.
Figure 5B:
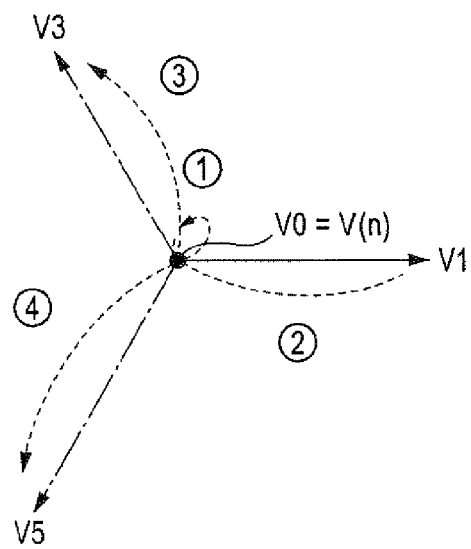
Figure 5C:
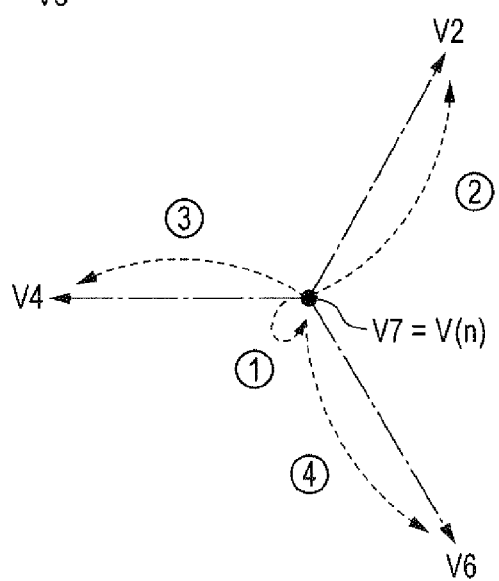

This will be described referring to FIGS. 5A to 5C. In the example of FIG. 5A, assuming that the voltage vector V(n) applied in the control period (n) is V1, there are four candidate voltage vectors which could be applied in the control period (n+1), i.e., V0, V1, V2 and V6. For each of these, as can be understood from the table of FIG. 2A, no more than one of the phases of the motor-generator 10 will become connected to a changed voltage level when a transition is made from V(n) to V(n+1). Similarly, in the example of FIG. 5B, in which V(n) is the zero vector V0, there are again four candidate voltage vectors, i.e., the odd-numbered vectors V1, V3 and V5, and the zero vector V0. Similarly in the example of FIG. 5C, in which V(n) is the zero vector V7, the candidate voltage vectors are the even-numbered voltage vectors V2, V4 or V6, and the zero vector V7.

Each time a candidate voltage vector has been determined in step S14, step S16 is executed in which a corresponding predicted current vector (ide(n+2), iqe(n+2)) is calculated. This is a current vector which is predicted to be attained at the updating timing (n+2) (by the end of the next control period (n+1)) if that candidate voltage vector were to be applied for the control period (n+1). This prediction calculation is performed as described for step S12 above, executed for a prediction interval having a duration equal to the control period duration. However in this case, the predicted current values ide(n+1), iqe(n) from step S10 are used as initial values, together with adjusted d,q values vd(n+1),vq(n+1) of the voltage vector V(n).

Figure 10B:
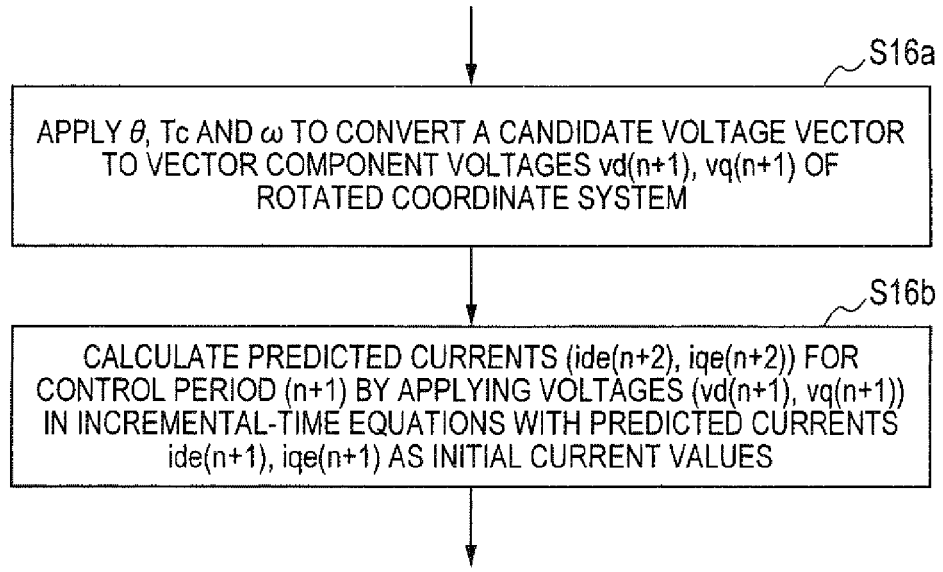

These contents of step S16 are illustrated in step FIG. 10B. As shown (step S16A), d,q component values vd(n+1),vq(n+1) of the candidate voltage vector are obtained by applying an electrical angle (θ+ω·Tc) to rotate the d,q axes. Here, ω is the electrical angle variation speed which was acquired in step S10, while θ is the electrical angle value which was detected in step S10. A predicted current vector ide(n+2),iqe(n+2) corresponding to this candidate voltage vector is then calculated (step S16B), by applying the voltage vector vd(n+1),vq(n+1) in discrete-time difference equations as described above, using the predicted current vector components ide(n+1), iqe(n) as initial values of current in the calculations.

Each time step S16 is completed, a decision is made (step S18) as to whether predicted current vectors have been derived corresponding to all of the candidate voltage vectors. If not, operation returns to step S14, while if there is a YES decision, step S20 is then executed.

In step S20, for each of the candidate voltage vectors, the corresponding predicted current vector ide(n+2),iqe(n+2) is evaluated. In FIG. 1, for simplicity of description, the vector ide(n+2),iqe(n+2) is designated as (ide, iqe). Specifically, the vector difference between each predicted current vector (ide, iqe) and the command current vector (idr, iqr) is derived, then the square of the modulus of the difference vector is calculated, to obtain an evaluation coefficient J as a (scalar) absolute value. The lowest value Jmin that has been obtained for J is then determined.

Figure 11:
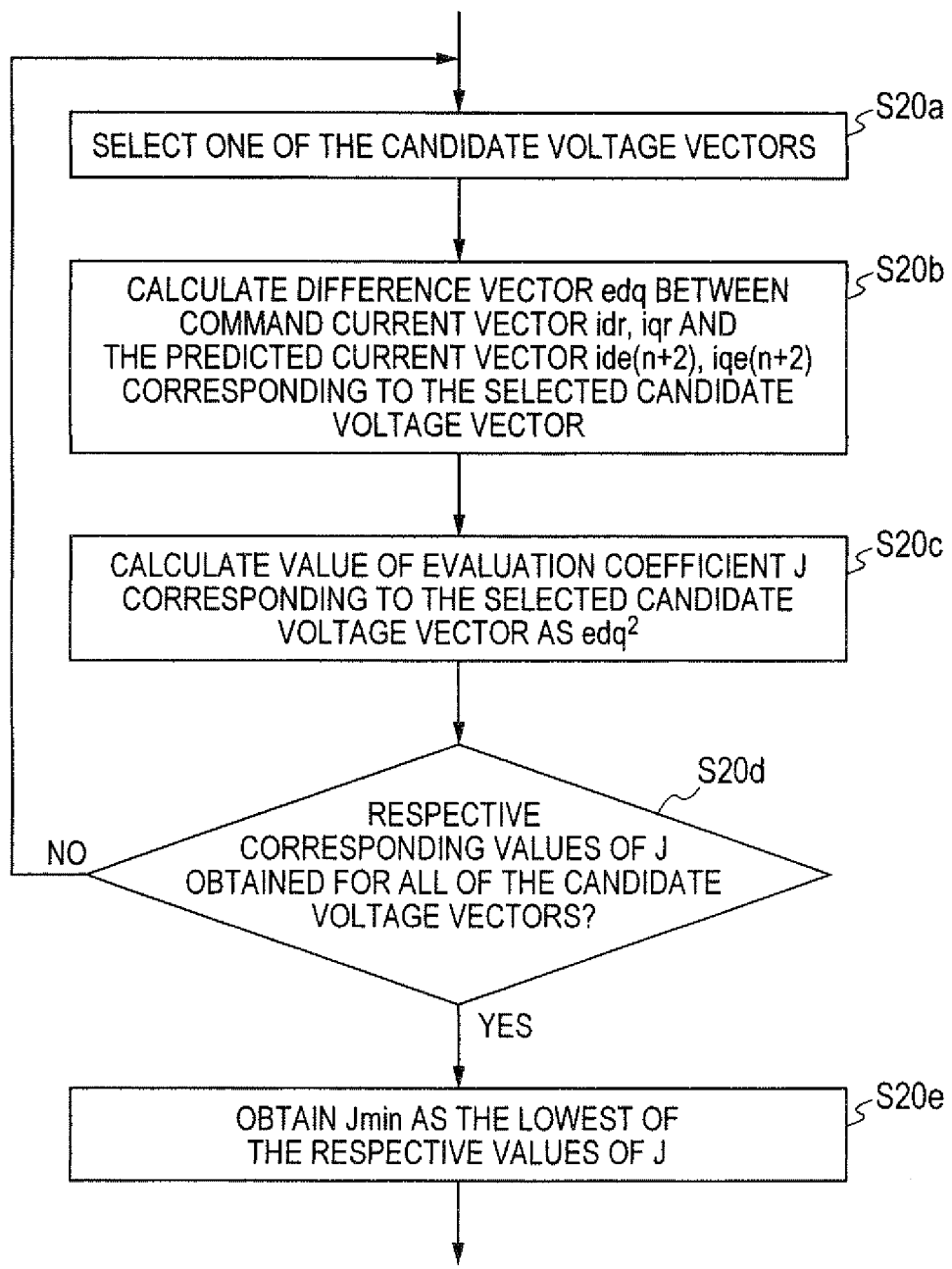

The processing contents of step S20 are illustrated in FIG. 11.

Step S22 is then executed, to judge whether a plurality of candidate voltage vectors each correspond to the lowest evaluation coefficient Jmin. If only a single candidate voltage vector corresponds to that lowest value, step S26 is executed, to select that candidate voltage vector to become the next voltage vector V(n+1).

However if it is found in step S22 that a plurality of the candidate voltage vectors each have the lowest value of the evaluation coefficient, then step S24 is executed, in which the one out of that plurality of candidate voltage vectors which is next in a forward sequence is selected, to become the next voltage vector V(n+1).

Here, "forward sequence" of the voltage vectors V0~V7, at any particular time, signifies the sequence which corresponds to the direction in which the rotor of the rotary machine is rotating at that time (that rotation direction being referred to in the following as the "forward direction" for simplicity). If the rotation direction is not permanently fixed, then a rotation detection sensor, etc., may be used to detect the direction of rotation, and thereby determine whether the voltage vector sequence V0, V1, V2, . . . or the sequence V0, V7, V6, . . . currently is the "forward sequence".

Referring to FIG. 2B for example, assuming the (counterclockwise) sequence of voltage vectors V0, V1, . . . , V7 corresponds to the forward direction of rotation, that sequence of voltage vectors (i.e., sequence of operation states of the inverter 8) is the "forward sequence".

Thus for example, with the sequence V0, V1, . . . , V7 being the forward sequence, if V2 and V1 are candidate voltage vectors which each have the lowest evaluation coefficient Jmin, vector V2 would be selected in step S24.

Alternatively, step S24 may be executed such that if the plurality of candidate voltage vectors having the same lowest value of evaluation coefficient include both a zero vector and non-zero vectors, then the voltage vector V(n+1) is set as the zero vector. This can reduce the number of selection branches (number of candidate voltage vectors), when the processing of steps S14 to S22 is subsequently again performed.

Following, step S24 or step S26, step S28 is executed in which the selected candidate voltage vector is designated as the one of the voltage vectors V0~V1 which is to be applied in the next control period.

At the updating timing (n+1) (commencement of the next control period (n+1) as illustrated in FIG. 9) the processing routine of FIG. 4 is repeated, while the operation state of the inverter 8 is set in accordance with the previously determined voltage vector V(n+1).

It can thus be understood that with this embodiment, the operation state of the inverter 8 for the next control period (n+1) is determined by processing executed in the present control period (n), based on prediction calculation applying a mathematical model of the motor-generator 10.

Figure 6A:
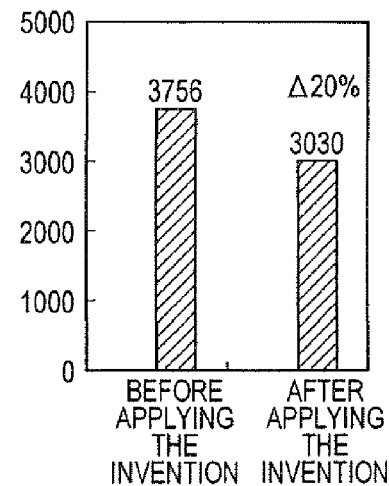
FIGS. 6A, 6B, 6C are diagrams showing results obtained for the first embodiment.
Figure 6B:
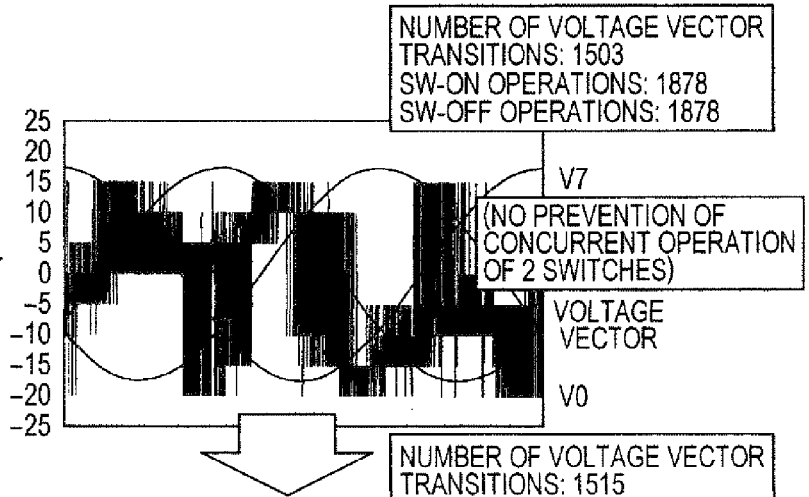
Figure 6C:
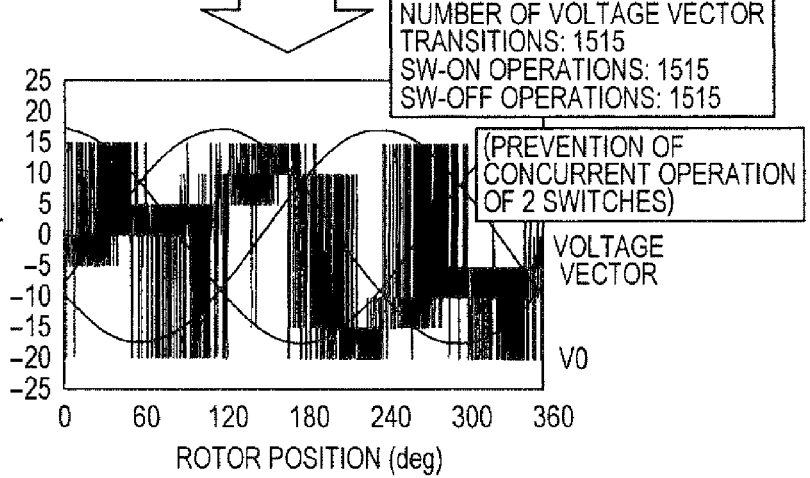

FIG. 6A shows graphs of experimental results (number of switching operations) obtained before and after applying the processing of the above embodiment in controlling an IPMSM. FIGS. 6B, 6C are corresponding waveform diagrams, corresponding to FIG. 6A, showing time-axis variations in the voltage vectors, obtained before and after applying the processing of the above embodiment. Here, "before" signifies that the voltage vector to be set as the next voltage vector V(n+1)) is selected from all of the voltage vectors V0~V7, without applying the above-described limitation for selecting the candidate voltage vectors. As shown, the invention enables the frequency of switching operations by the switching elements of the inverter to be substantially reduced, while at the same time ensuring that simultaneous switching of a plurality of phases is prevented, so that the amplitude of voltage surges can be reduced.

Figure 7:
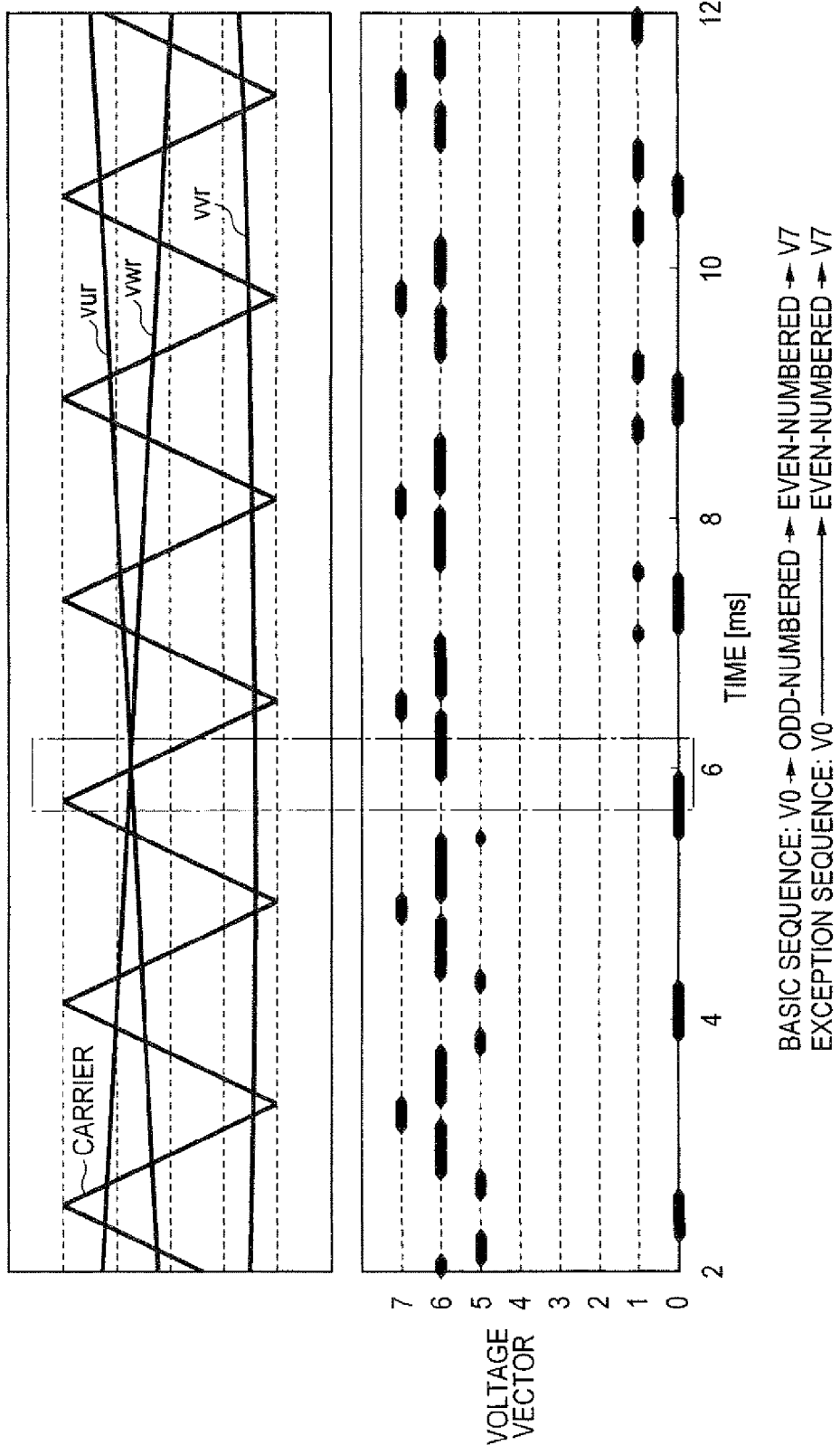
FIG. 7 is a timing diagram illustrating transitions of switching conditions, for triangular-wave PWM control.

It should be noted also that if a prior art method of triangular-wave comparison PWM control were to be applied to the inverter which drives the motor-generator 10, then in that case too, a condition of simultaneous changeover of more than one phase state is not prevented. This point is illustrated in FIG. 7, showing a condition of triangular-wave comparison PWM control in which two of three-phase command voltages vur, vvr and vwr intersect such that the switching conditions of two of the phases are changed over concurrently. In the example of FIG. 7, a changeover from the zero vector V0 to an even-numbered voltage vector occurs at the time point when the command voltages vur and vwr intersect. Hence the principles of the present invention could be advantageously applied to such PWM control.

The features of the first embodiment can be summarized as follows:

Firstly, when determining the next operation state that is to be established for the inverter 8, it is ensured that no more than one of the phases of the motor-generator 10 will be switched (i.e., become connected to a different voltage level) when the operation state is updated. This serves to limit the magnitude of voltage surges which may arise when the operation state of the inverter 8 is changed, by comparison with the case in which concurrent switching of a plurality of phases can occur.

Secondly, when a plurality of voltage vectors (each expressing a specific operation state of the inverter 8) are each receive identical high evaluation results (i.e., a plurality of candidate voltage vectors each correspond to the lowest evaluation coefficient Jmin), the voltage vector which is next in the above-defined forward sequence is selected. This serves to reduce the number of changeovers of the switching elements that occur within each electrical angle period, by reducing a tendency for the successively selected voltage vectors to vary irregularly.

Second Embodiment

Figure 8:
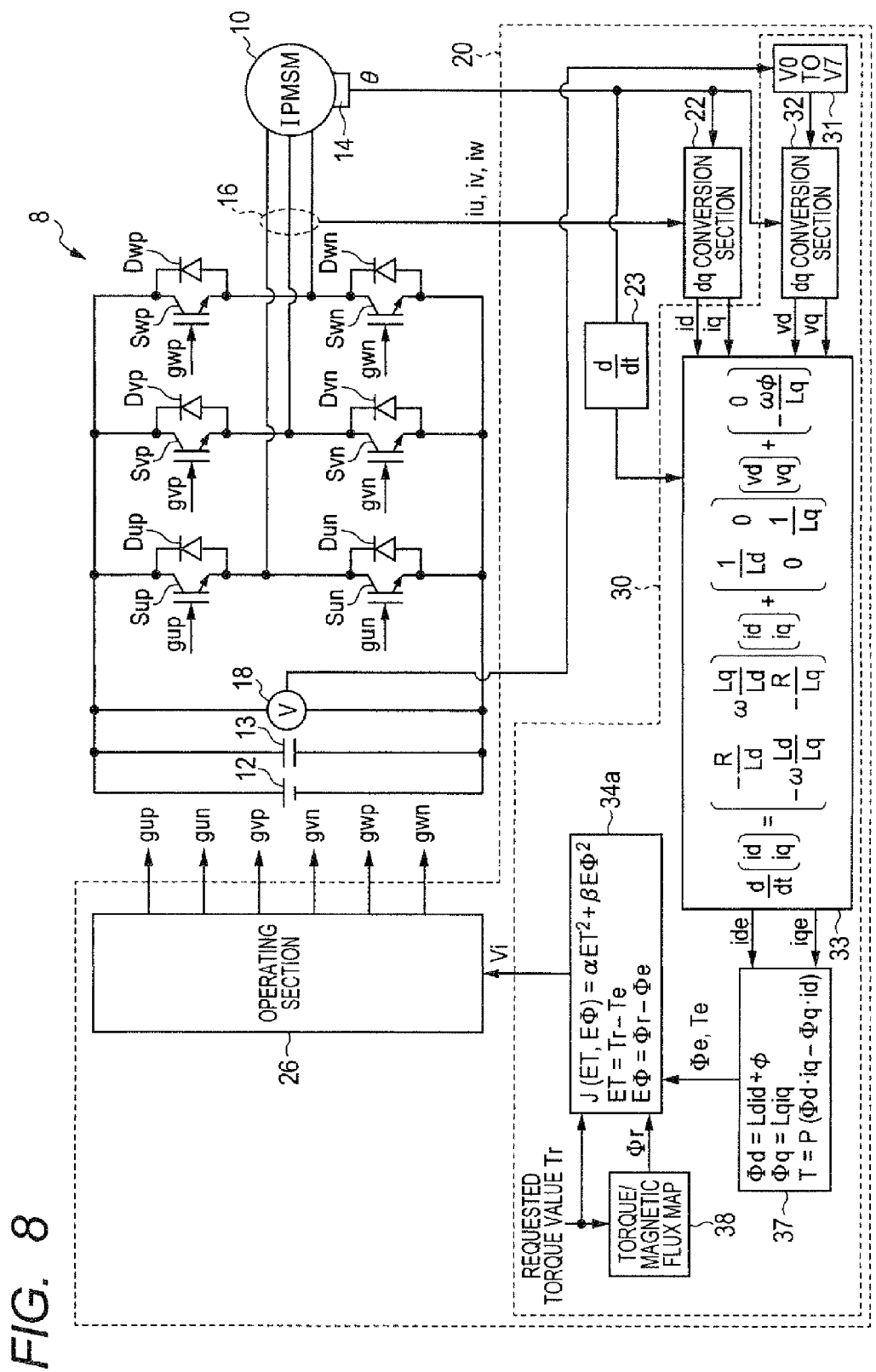
FIG. 8 shows a system diagram of a second embodiment of a control apparatus.

A second embodiment of a control apparatus for an inverter of a IPMSM will be described in the following referring to FIG. 8. Only points of difference between this embodiment and the first embodiment of FIG. 1 will be described in detail, and components of the second embodiment which correspond to components of the first embodiment are designated by identical reference numerals to those of FIG. 1.

The second embodiment essentially differs from the first embodiment in that the direct control quantities (quantities whose values are predicted for use in evaluation processing for determining the next operation state of the inverter) are torque and magnet flux. The predicted current vector values ide(n+2), iqe(n+2) for the control period (n+1) following the control period (n) are derived as described above for the first embodiment. However with the second embodiment, this predicted current vector is then converted by a torque/magnetic flux determining section 37 to a corresponding combination of predicted torque Te and predicted magnetic flux vector Φe (i.e., Φde, Φqe). The predicted magnet flux vector is derived by applying the predicted current vector component values ide(n+2), iqe(n+2) as id, iq respectively in equations (c5), (c6) below, and similarly ide(n+2), iqe(n+2) are applied in equation (c7) for deriving the predicted torque value $$\Phi d = Ld i \cdot d + \phi \quad (c5)$$

$$\Phi q = Ld \cdot iq \quad (c6)$$

$$T = P(\Phi d \cdot iq - \Phi q \cdot id) \quad (c7)$$

In equation (c7), P denotes the number of pole pairs of the motor-generator 10.

The request value of torque Tr is inputted to the 38, which outputs a corresponding command value of magnetic flux vector Φr. Each value of Φr stored in the torque/magnetic flux map 38 may for example be derived as the magnetic flux vector which is estimated to provide a corresponding requested torque value while requiring a minimum amount of current.

Figure 12:
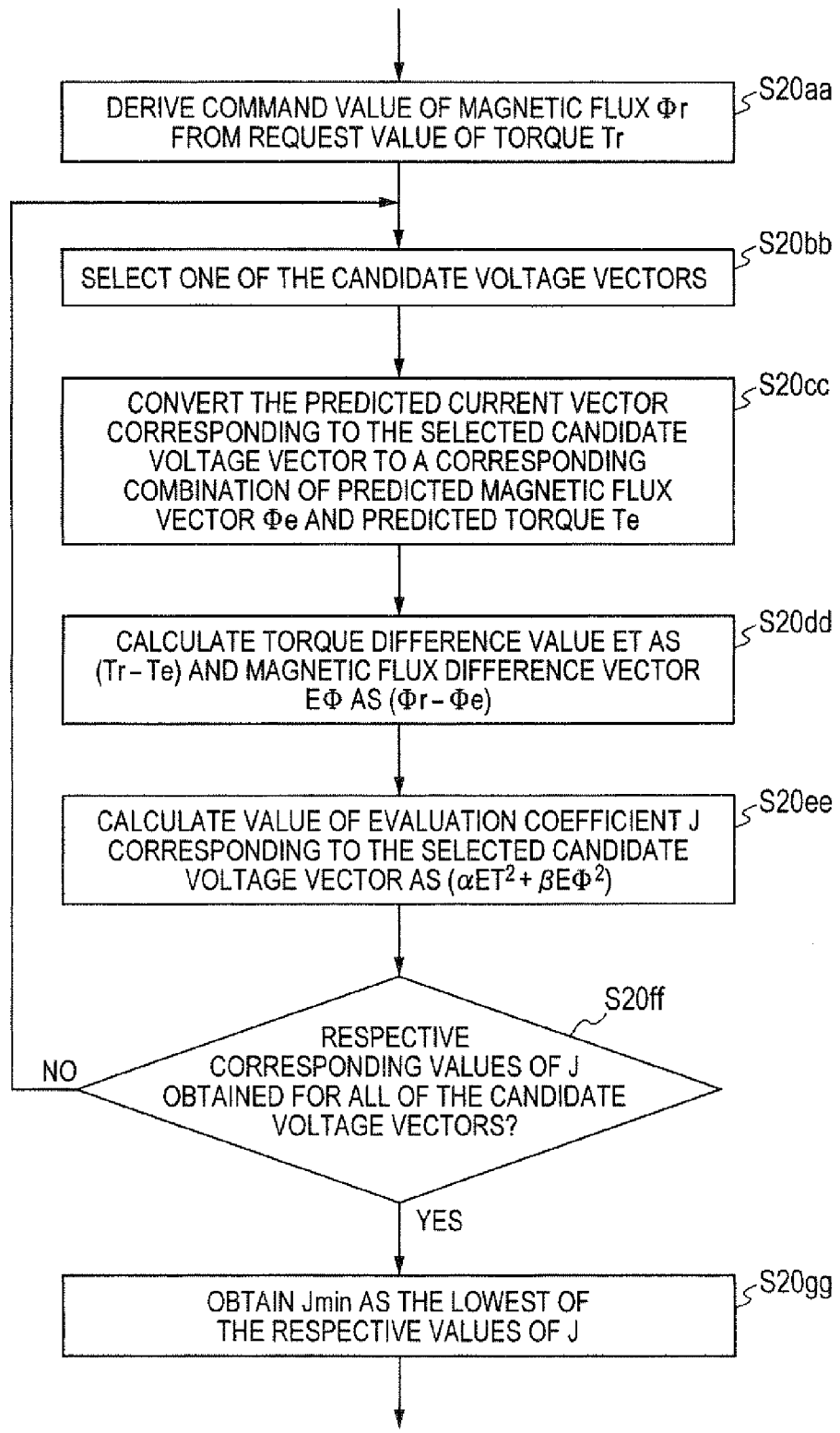
Figure 13:
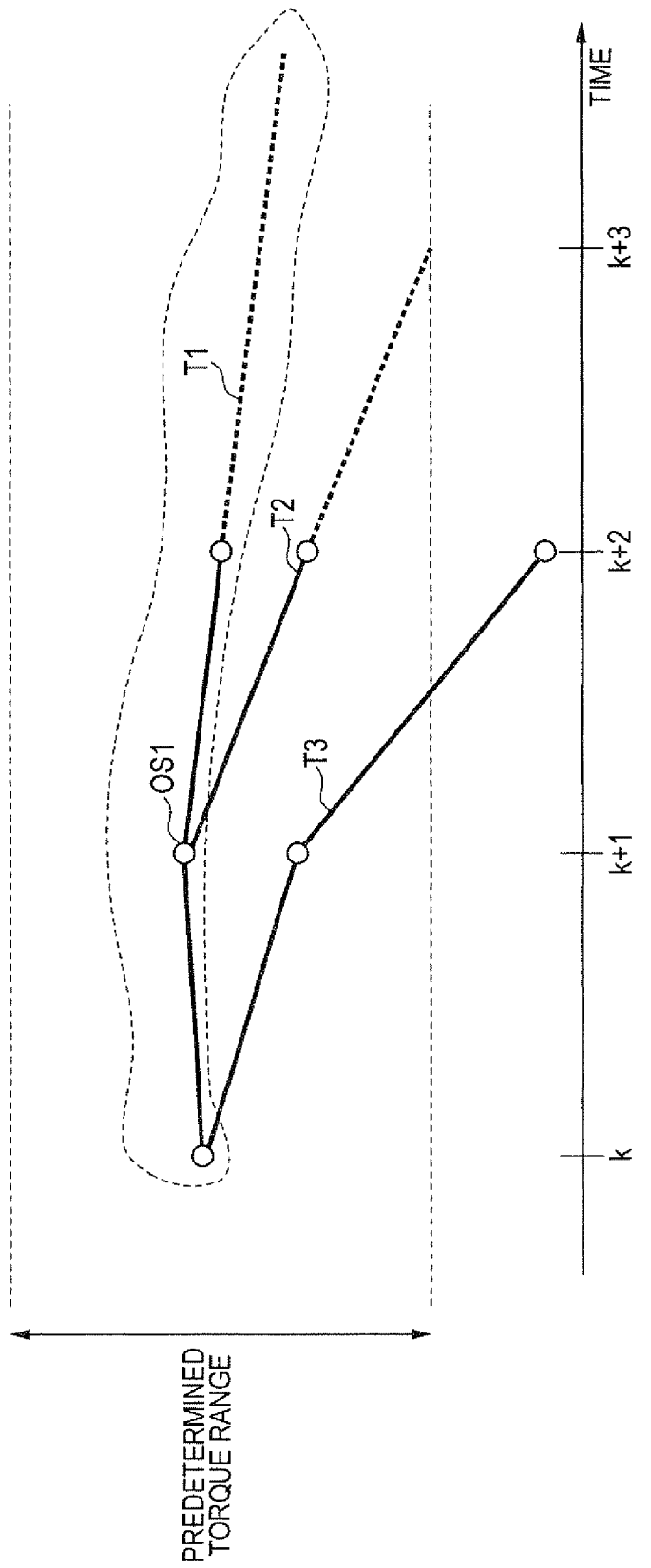
FIG. 13 is a conceptual diagram for use in describing a prior art example of a control apparatus for a polyphase rotary machine.

The operating state determining section 34a of this embodiment has a similar function to the operation state determining section 34 of the first embodiment, i.e., to determine (during the current control period) the one of the voltage vectors V0~V7 which is to be set for the succeeding control period, with the determination made based upon an evaluation coefficient J. With this embodiment, the processing contents of step S20 in the flow diagram of FIG. 4, for obtaining the evaluation coefficient J, are illustrated in the flow diagram of FIG. 12. As shown, the difference vector EΦ between the command magnetic flux vector Φr and the predicted magnetic flux vector Φe is obtained, and the square of EΦ (i.e., square of the modulus) is calculated. The difference ET between the request value of torque Tr and the predicted torque value Te is calculated, and the square of that difference ET is obtained. The square of the difference vector EΦ is multiplied by a weighting value β, while the square of the difference ET is multiplied by a weighting value α (α≠β, α≠0, β≠0) and the multiplication results are summed, to obtain the evaluation coefficient J. The weighting coefficients α and β are predetermined such to establish an appropriate relationship between the squared torque and magnetic flux values. That is to say, if the units used to measure torque are such that the numeric value of torque is excessively high, then the contribution of the torque term to the evaluation coefficient J will be excessively large. Hence, the relative contributions of the magnetic flux term (αET$^2$) and the torque term (βEΦ$^2$) to the value of J can be adjusted appropriately, by suitably determining the values of α and β. Thus for example, control of magnetic flux (by selecting respective voltage vectors V0~V7 based on the evaluation results) can be adjusted as required by appropriately adjusting the weighting coefficients α and β.

Hence when a combination of a plurality of control quantities is used in calculating the evaluation coefficient J, compensation of respective absolute parameter values (squared values) corresponding to these control quantities can be performed by adjusting weighting coefficients such as α and β.

As can be understood from the above, with the second embodiment, predicted values of the control quantities (magnetic flux vector, torque) are obtained based on predicted current values, whereas the control quantity (current vector) of the first embodiment is obtained based on directly detected values of current (iu, iv, iw) of respective phases of the motor-generator 10. With the second embodiment, the operation state of the inverter 8 for the next control period (n+1) is determined during the present control period based on a combination of a torque value and magnetic flux vector which are predicted to be respectively attained by the end of the next control period. That is, a predicted combination of torque value and magnetic flux vector is calculated for each of the candidate voltage vectors, and evaluation is performed based on that combination. In other respects the operation is similar to that of the first embodiment.

Alternative Embodiments

The invention is not limited to the above embodiments, and various other alternative forms or modifications of the embodiments may be envisaged, for example as follows:

Limiting of Number of Concurrently Switched Phases to One or Zero.

With the above embodiments as described for step S26 of FIG. 4, when a single candidate voltage vector is found to correspond to the lowest value of evaluation coefficient (Jmin), then that candidate voltage vector is selected to become V(n+1), i.e., to determine the operation state of the inverter in the next control period. However it is not necessarily essential to select the candidate voltage vector corresponding to Jmin. An alternative method of selection, is as follows. The remaining candidate voltage vectors (i.e., which each correspond to an evaluation coefficient value higher than Jmin) are examined. If one of these candidate voltage vectors satisfies specific conditions, i.e., corresponds to a value of evaluation coefficient J that is less than a predetermined threshold value and also is next in the above-defined forward sequence of the voltage vectors, then the candidate voltage vector which satisfies these conditions would be selected to become V(n+1).

For example referring to FIG. 2B, with the voltage vector sequence V0, V1, . . . , V7 being the forward sequence (as defined above) then assuming that V2 and V3 are candidate voltage vectors, and that the evaluation coefficient J corresponding to vector V3 differs from Jmin by less than the predetermined threshold value, vector V3 will be selected to become the next voltage vector (V(n+1)), even if the vector V2 corresponds to the lowest evaluation coefficient value Jmin.

With the above embodiments, any voltage vector (one of V(0)~V(7)) which differs from the present voltage vector V(n) by no more than one phase state changeover can be selected as a candidate for becoming the voltage vector that will be applied in the next control period. However it would be equally possible to arrange that a voltage vector can be selected as a candidate voltage vector only if it is next in the forward sequence of the voltage vectors or is the present voltage vector.

With the above embodiments, when it is judged that a plurality of candidate voltage vectors each correspond to the lowest value Jmin of evaluation coefficient, the one of these candidate voltage vectors which is next in the forward sequence of the voltage vectors is selected to become the next voltage vector (V(n+1)). However similar advantages to those of the above embodiments can be attained even if that selection condition is not applied.

Model Prediction Methods

With the above embodiments at each updating timing (as illustrated in FIG. 9) the control quantity (with the first embodiment, stator current vector) which will be attained at the next-but-one updating timing is predicted for each candidate voltage vector. Thus in FIG. 9, the current vector (ide(n+2),iqe(n+2) is predicted at the updating timing (n), i.e., the control quantity values predicted to be attained at the updating timing (n+2), that is, attained by the end of the control period (n+1) which succeeds the present control period (n). However it would be equally possible to predict the control quantity value that will be attained after a plurality of control periods which will succeed the present control period.

With the above embodiments the phase current values (iu, iv, iw) are detected, to obtain id(n), iq(n), at each of the updating timings. However it would be equally possible to detect these values of current at other timings, e.g., midway within each control period. In that case for example referring to step S12 of FIG. 4, predicted values of current would be used as initial values in the calculation (i.e. predicted values which had been calculated using detected values of current as initial values, with the detection having been performed midway through the preceding control period (n−1)).

With the above embodiments the electrical angle θ is detected at each of the updating timings. However it would be equally possible to instead detect 8 at other timings, e.g., midway within each control period. In that case for example referring to step S12 of FIG. 4 (specifically, to step S12a of FIG. 10A), an estimated value of θ could be utilized instead of a currently detected value. The estimated value of θ would be obtained for example by incrementing the precedingly detected value of θ (if detected midway within the preceding control period (n−1)) by an angular amount (Tc/2)·ω.

With the above embodiments the processing for determining the operation state (one of the voltage vectors V0~V7) to be applied in the next control period is executed at the start of the present control period. However it might be possible to execute that processing at an intermediate timing within the present control period. If for example values of current and of electrical angle θ are detected midway within each control period, the prediction processing of step S12 in FIG. 4 could be performed at that timing (using a prediction interval equal to ½ of the control period duration) to obtain the predicted current values ide(n+1), iqe(n+1).

With the above embodiments, for each candidate voltage vector, the corresponding values of (vector) current that will be attained at the end of the next control period are predicted. However it would be equally possible to calculate (for each candidate voltage vector) corresponding predicted values of current vector that will be attained before completion of the next control period, for example will be attained at the midpoint of the next control period.

The invention is not limited to performing prediction of values of a control quantity by using difference equations for discrete-time modeling of a continuous-time system. It would be equally possible to use a linear multi-step method with N steps (N≧2), or the Lunge-Kutta method, etc.

With the above embodiments, effects of iron losses are not considered in the model used for calculating predicted current values. However it would be equally possible to use a model in which iron losses are taken into account.

The model used for calculating predicted current values with the above embodiments is based on the assumption that only fundamental-waveform voltages are produced. However it would be equally possible for the model to take into account high-frequency components due to induced voltages (determined by inductance values), etc.

With the above embodiments above, predicted values of a current vector are calculated based on discrete-time difference equations using predicted values that are derived by modeling the rotary machine. However it would be equally possible to utilize a data map for deriving these predicted values, with voltage vector (vd, vq values) and electrical angular velocity ω being input parameters of the map. Such a map would store values of change in current vector, occurring over a discrete-time step, for each of respective combinations of the input parameters. Values of detected temperature relating to the motor-generator 10 could also be applied as an input parameter of the map.

Similarly, with the second embodiment above it is necessary to obtain predicted values of torque. In that case, if a data map is utilized as described above, the output parameter would be torque and the input parameters would be current vector and electrical angular velocity values. In this case too, values of detected temperature relating to the motor-generator 10 could also be an input parameter of the map.

Control Quantity

With the above embodiments, the control quantity is either a current vector or a combination of a torque value and magnetic flux vector. However it would be equally possible to utilize a magnetic flux vector alone, or torque value alone, as the control quantity. Furthermore with the second embodiment above, predicted values of torque and magnetic flux (Te, Φe) are derived from predicted values of current (as illustrated by step S20 cc of FIG. 12), with only values of current being directly detected. However it would be equally possible to calculate predicted values of a control quantity other than current (such as magnetic flux) based upon initial values that are directly detected by a sensor.

With the above embodiments, the quantity that is basically controlled (not necessarily the quantity which is predicted) is the amount of torque developed by the motor-generator 10. However the invention is not limited to this, and could for example be applied to controlling the rotation speed, etc., of a rotary machine.

The essential feature of the invention consists of selecting at each of successive time points, as the next voltage vector (next operation state of the inverter), a voltage vector which will result in no more than one of the phases of the rotary machine being switched to a changed voltage level and also is optimum with respect to maintaining the control quantity close to a required value. This is ensured by the contents of steps S14 to S28 in the processing sequence of FIG. 4. Hence it will be understood that the claimed scope of the invention extends to a modified embodiment in which step S12 would be omitted, and the contents of S16 replaced by those shown for step 12 in FIG. 4. In that case, changeover to the next voltage vector (updated operation state of the inverter) would be performed by immediately setting the newly specified voltage vector, when that voltage vector has been specified in step S28.

It should further be noted that the invention is not limited in application to an internal permanent magnet type of rotary machine, but could be applied to synchronous types of rotary machine in general, such as a surface permanent magnet type of synchronous machine, field winding type of synchronous machine, etc. Furthermore the invention is not limited in application to synchronous types of rotary machine, but could equally be applied to induction types of rotary machine such as induction motors, etc.

It should further be noted that the invention is not limited in application to a type of rotary machine for installation in a hybrid type of motor vehicle, but could be applied to rotary machines for installation in an electric vehicle. Furthermore the invention is not limited in application to rotary machines for installation in motor vehicles.

With the above embodiments, a high-voltage battery 12 is utilized as a DC power source, however it would be equally possible to apply the invention to system in which the DC supply voltage of the inverter which drives the rotary machine is obtained from a voltage step-up inverter, which steps-up the output voltage from a DC voltage source such as a battery.

Furthermore with the control apparatus of the above embodiments, a plurality of switching elements of a power converter circuit are controlled to selectively apply two different voltage levels (the positive-side and negative-side potentials of the high-voltage battery 12), derived from a DC power source, to each of the phases of a 3-phase rotary machine. However the invention would be equally applicable to a control apparatus whereby a plurality of switching elements of a power converter circuit are controlled to selectively apply three or more different voltage levels to each of the phases of a multi-phase rotary machine.

What is claimed is:

1. A control apparatus for controlling a control quantity of a polyphase rotary machine by operating an electric power converter circuit comprising a plurality of switching elements coupled to respective phases of said polyphase rotary machine, the electric power converter circuit including means for supplying current at a plurality of respectively different DC voltage levels, said switching elements being controlled for selectively connecting each phase of said polyphase rotary machine to said plurality of DC voltage levels, and said control apparatus comprising prediction circuitry configured for predicting future values of said control quantity based on respective assumed operation states of said power converter circuit, said operation states comprising respective combinations of connection statuses of said phases to said plurality of DC voltage levels, and operation control circuitry configured for determining a future operation state to be established for said electric power converter circuit, with said determination based upon said predicted future values of said control quantity;

wherein said operation control circuitry is configured to execute said determination such that a specific changeover requirement is satisfied, whereby no more than one of said phases becomes connected to a changed voltage level when a changeover occurs from a present operation state of said power converter circuit to said future operation state.

2. A control apparatus as claimed in claim 1, coupled to receive a command value of said control quantity, wherein said possible operation states of said power converter circuit correspond to respective voltage vectors of output voltages from said power converter circuit, and wherein said operation control circuitry comprises selection circuitry configured for selecting a plurality of candidate ones of said voltage vectors, each of said candidate voltage vectors satisfying said specific changeover condition;

said prediction circuitry is configured to calculate, for each of said candidate voltage vectors, a corresponding predicted value of said control quantity, and said selection circuitry is configured to:

evaluate each of said candidate voltage vectors, based upon said command value in relation to said predicted value corresponding to said candidate voltage vector;

select one of said candidate voltage vectors based upon results of said evaluation; and determine said future operation state of said power converter circuit as an operation state corresponding to said selected candidate voltage vector.

3. A control apparatus as claimed in claim 2, wherein said operation control circuitry is configured:

to select a candidate voltage vector having a highest evaluation, when a single candidate voltage vector receives said highest evaluation; and when a plurality of said candidate voltage vectors receive said highest evaluation, to select a candidate voltage vector which is next in a forward sequence of said voltage vectors, said forward sequence corresponding to a direction in which a rotor of said polyphase rotary machine is currently rotating.

4. A control apparatus as claimed in claim 2, wherein said command value of said control quantity is expressed as a command control quantity vector and said prediction circuitry is configured to calculate, for each of said candidate voltage vectors, component values of a corresponding predicted control quantity vector.

5. A control apparatus as claimed in claim 4, wherein, and said operation control circuitry is configured to:

calculate, for each of said candidate voltage vectors, a difference vector between said command control quantity vector and said corresponding predicted control quantity vector, and calculate an evaluation coefficient corresponding to said candidate voltage vector as the square of a modulus of said difference vector; and determine said selected candidate voltage vector as a candidate voltage vector corresponding to a lowest value of said evaluation coefficient.

6. A control apparatus as claimed in claim 4, wherein at each of periodic updating timings occurring during respective fixed-duration control periods, said operation control determines an operation state of said electric power converter circuit that is to be established for an immediately succeeding control period, wherein said control quantity comprises a current vector expressing a combination of phase current values of said rotary machine, and said control apparatus comprises a sensor for detecting actual values of said phase current values and means for detecting an electrical angle of a rotor of said rotary machine, and wherein said prediction circuitry is configured to:

receive a currently detected set of said phase current values and a currently determined one of said voltage vectors at a currently occurring updating timing and convert said detected phase current values to an actual current vector, with component values of said actual current vector being measured with respect to a coordinate system that is rotated from a reference orientation by said currently detected electrical angle, and express said currently determined voltage vector as a first converted voltage vector with respect to said coordinate system, apply said first converted voltage vector in discrete-time difference equations to calculate component values of a first predicted current vector, said difference equations being based on a mathematical model of said rotary machine, with said component values of said actual current vector being applied as initial current values in said calculation and with said calculation being executed for a first prediction interval, said first prediction interval having said control period duration, derive an estimated angular amount as an amount of change in said electrical angle estimated to occur during a first control period following said present updating timing, increment said rotation of said coordinate axis system by said estimated angular amount, and express said currently determined voltage vector as a second converted voltage vector with respect to said coordinate system, and for each of said candidate voltage vectors, apply said second converted voltage vector in said discrete-time difference equations to calculate a corresponding second predicted current vector as said corresponding predicted control quantity vector, with components of said first predicted current vector being applied as initial current values in said calculation, and with said calculation being executed for a second prediction interval, having a predetermined fixed duration.

7. A control apparatus as claimed in claim 6, wherein said second prediction interval has a duration equal to said control period duration.

8. A control apparatus as claimed in claim 1 comprising a DC power source, wherein said plurality of switching elements are controlled for selectively connecting each of said phases of said rotary machine to a positive-polarity voltage and a negative-polarity voltage of said DC power source.

* * * * *